United States Patent
Ahn

(10) Patent No.: US 7,830,468 B2
(45) Date of Patent: Nov. 9, 2010

(54) MOUNTING FRAME COMBINATION STRUCTURE OF LIQUID CRYSTAL DISPLAY DEVICE

(75) Inventor: Sam Young Ahn, Kumi-shi (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/477,726

(22) Filed: Jun. 28, 2006

(65) Prior Publication Data

US 2006/0244876 A1   Nov. 2, 2006

(51) Int. Cl.
  *G02F 1/1333* (2006.01)
(52) U.S. Cl. ....................................... 349/58
(58) Field of Classification Search ............ 349/58; 361/682
  See application file for complete search history.

(56) References Cited

U.S. PATENT DOCUMENTS

| | | | |
|---|---|---|---|
| 5,838,412 A | 11/1998 | Ueda et al. | |
| 6,147,724 A * | 11/2000 | Yoshii et al. | 349/62 |
| 6,891,582 B2 | 5/2005 | Hwang | |
| 6,979,114 B2 | 12/2005 | Kao | |
| 7,083,318 B2 * | 8/2006 | Ha et al. | 362/633 |
| 7,088,403 B2 * | 8/2006 | Kim | 349/58 |
| 2002/0080297 A1 * | 6/2002 | Sung | 349/58 |
| 2002/0186526 A1 * | 12/2002 | Kim | 361/681 |
| 2002/0191125 A1 * | 12/2002 | Kim et al. | 349/58 |
| 2003/0169383 A1 * | 9/2003 | Kim | 349/58 |
| 2003/0234895 A1 * | 12/2003 | Sugawara et al. | 349/58 |
| 2004/0212756 A1 * | 10/2004 | Fukayama et al. | 349/58 |

FOREIGN PATENT DOCUMENTS

| | | |
|---|---|---|
| JP | 11237846 | 8/1999 |
| JP | 11344937 | 12/1999 |
| JP | 2001-330817 | 11/2001 |
| JP | 2002-040396 | 2/2002 |
| JP | 2002-207438 | 7/2002 |
| JP | 2002-215061 | 7/2002 |

OTHER PUBLICATIONS

Office Action dated Apr. 23, 2007 for corresponding Japanese Patent Application No. 2003-411512.
Examiner's Refusal Decision for corresponding Japanese Patent Application Serial No. 2003-411512, dated Nov. 16, 2007.
Office Action issued in corresponding Japanese Patent Application No. 2003-411512; mailed Feb. 2, 2009.

* cited by examiner

*Primary Examiner*—David Nelms
*Assistant Examiner*—Thanh-Nhan P Nguyen
(74) *Attorney, Agent, or Firm*—Brinks Hofer Gilson & Lione

(57) ABSTRACT

A mounting frame combination structure is disclosed, for decreasing a profile thickness of an LCD device, which includes a main support accommodating an LCD panel which may display a picture image or other information, and a backlight provided below the LCD panel; a sash provided above the main support, for retaining the LCD panel and the main support from a front side; a bottom cover provided below the main support and supporting the backlight; and, a mounting frame positioned between the side surfaces of the bottom cover and joined thereto by a fastener. In case a step-difference portion is formed in an outer surface of the sash, the mounting frame is fastened to the main support.

11 Claims, 3 Drawing Sheets

MOUNTING FRAME COMBINATION STRUCTURE OF LIQUID CRYSTAL DISPLAY DEVICE

This application claims the benefit of the Korean Application No. P2002-83299 filed on Dec. 24, 2002 and the U.S. application Ser. No. 10/732,321 filed on Dec. 10, 2003, which are incorporated herein by reference.

BACKGROUND OF THE INVENTION

1. Field of the Invention

The present invention relates to a liquid crystal display (LCD) device, and more particularly to an improved mounting frame combination structure of an LCD device for obtaining a thin profile of the LCD device.

2. Discussion of the Related Art

A cathode ray tube (CRT), one type of display device, has been widely used for television monitors, measurement instruments and information terminals. However, the CRT has limitations to miniaturization and lightness in weight. With the trend of miniaturization and lightness in electronic machines, display devices such as a liquid crystal display (LCD) device using an electro-optics effect, a plasma display panel (PDP) using a gas discharge and an electro luminescence display (ELD) device using an electro-luminescence effect have been actively studied, and which can substitute for the CRT.

Among the display devices, the LCD device is most actively studied in that the LCD device realizes excellent picture quality, low power consumption and low heat emission as compared with those of the CRT. Herein, the LCD device includes main components such as a liquid crystal module (hereinafter, referred to as an "LCM") and a mounting frame. The LCM, a flat display device, has a backlight and an LCD panel. The LCM is combined with the mounting frame, and then is mounted on a monitor.

Hereinafter, a mounting frame combination structure of an LCD device according to the related art will be described with reference to the accompanying drawings. This structure can be utilized to mount other types of flat panel displays, such as plasma panels and electro-luminescent panels. In this disclosure, the term LCD is considered to encompass any flat panel display type.

FIG. 1 is a cross-sectional view illustrating one example of a mounting frame combination structure in an LCD device according to the related art. As shown in FIG. 1, an LCM 1 includes an LCD panel 25, and a backlight 20 provided below the LCD panel 25. The backlight 20 includes a plurality of optical sheets 21, a reflecting plate 22 and a light-guiding plate 23. Also, the backlight 20 and the LCD panel 25 are supported by a main support 2 having an empty space for accommodating the backlight 20 and the LCD panel 25 therein.

A sash 3 is provided at an upper portion of the support main 2, for retaining the LCD panel 25 and the main support 2, from a front side. Also, a bottom cover 4 is provided at a lower portion of the main support 2, thereby retaining the reflecting plate 22 and the light-guiding plate 23 from a rear side. The main support 2 is generally formed of a plastic material, and the bottom cover 4 is generally formed of a metal material such as aluminum, having greater thermal conductivity than that of the plastic material. A mounting frame 5 is provided at a rear portion of the LCM 1, for mounting the LCM 1 on a monitor housing (not shown). The mounting frame 5 is combined with the LCM 1 by a screw 6.

More specifically, holes are formed for penetrating a side portion 5a of the mounting frame 5, the sash 3 and the bottom cover 4. Thus, after attaching the side portion 5a to an outer surface of the sash 3, the mounting frame 5 is combined with the sash 3 and the bottom cover 4 by the screw 6, engaging a thread formed in the hole in the bottom cover. FIG. 2 is a cross-sectional view illustrating another example of a mounting frame combination structure of an LCD device according to the related art. Referring to FIG. 2, an LCM 1 includes an LCD panel 25 and a backlight 20, and the backlight 20 and the LCD panel 25 are supported by a main support 2 and a sash 3. Also, a mounting frame 5 is combined with a lower portion of the LCM 1, and the mounting frame 5 is combined with an outer surface of the sash 3 by a screw 6. Unlike the structure of FIG. 1, the screw 6 passes through a side portion of a main support 2, so that the mounting frame 5 is directly combined with the outer surface of the sash 3. In this case, the mounting frame 5 is directly combined with the main support 2, Thus, this method is generally used for structures requiring a thin profile in the depth direction.

However, the mounting frame combination structure of the LCD device according to the related art has the following disadvantages: in the mounting frame combination structure of the LCD device according to the related art, the side portion of the mounting frame is attached to the outer surface of the sash, whereby the width of the LCD device is increased by the thickness of the side portion of the mounting frame. Especially, with recent trend to a large-sized display screen while minimizing a housing width or a case width, the related art mounting flame combination structure has problems in that it is hard to realize the desired profile.

SUMMARY OF THE INVENTION

Accordingly, embodiments of the present invention are directed to a mounting frame combination structure of an LCD device that substantially obviates the problems due to limitations and disadvantages of the related art.

Embodiments of the present invention provide a mounting frame combination structure of an LCD device, for obtaining thinness of the LCD device by decreasing a width or height dimension. In this disclosure, the width direction is parallel to the LCD panel and horizontal, the height direction is parallel to the LCD panel and perpendicular to both the width dimension and the plane of the figures, and the depth direction is perpendicular to the LCD panel. The front is that surface of the LCD panel which is exposed to view and the rear is the opposite direction in the depth dimension.

Additional advantages and features of the invention will be set forth in part in the description which follows and in part will become apparent to those having ordinary skill in the art upon examination of the following or may be learned from practice of the invention.

To achieve these and other advantages and in accordance with the purpose of the invention, as embodied and described herein, an LCD device includes a main support accommodating an LCD panel displaying a picture image or other information, and a backlight provided behind the LCD panel; a sash, preferably made of metal, provided above the main support to retain the LCD panel and the main support from a front side; a bottom cover provided at the rear the main support, and supporting the backlight; and a mounting frame being combined with an inside of the bottom cover.

The mounting frame has an empty space for accommodating a circuit board (PCB) or other components, and a side portion of the mounting frame being combined with the inside of the bottom cover.

Each of the side portion of the mounting frame, the bottom cover and the sash may have a hole for accommodating a fastener, and screw thread may be provided in the inner surface of the hole in the surface separated furthest from the head of a screw which may be inserted from the outside surface of the sash. Other fasteners such as a nut and bolt, a rivet or adhesive may be used. Also, a hook may be provided in the side portion, and insertion holes may be provided in the sash and the bottom cover.

In another aspect, a mounting frame combination structure includes a main support accommodating an LCD panel displaying a picture image or other information, and a backlight provided to the rear of the LCD panel; a sash provided above the main support to retain the LCD panel and the main support from to a front side, and having a step-difference portion offset inwardly and parallel to an outer surface thereof; and, a mounting frame being combined with the step-difference portion of the sash.

The mounting frame has a space for a PCB or other components, and a side portion of the mounting frame is combined with the step-difference portion of the sash with a fastener.

The offset dimension of the step-difference portion is at least equal to the thickness of the side portion of the mounting frame.

Further, holes are respectively provided in the sash and the side portion of the mounting frame, a hole is provided in the main support, and a screw thread is provided in the inner surface of the hole in the main support A hook may be provided in the side portion as a fastening means, and insertion holes may be provided in the sash and the main support.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

The preferred embodiments of present invention will now be described in detail with reference to the accompanying drawings. Wherever possible, the same reference numbers will be used throughout the drawings to refer to the same or like parts.

Figure 1:
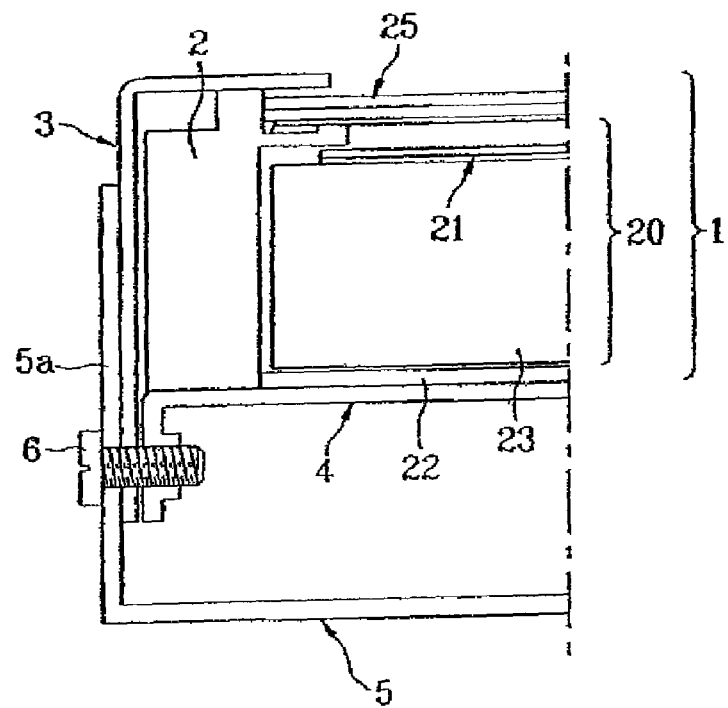
FIG. 1 is a cross-sectional view illustrating one end section of a LCD device according to the related art.
Figure 2:
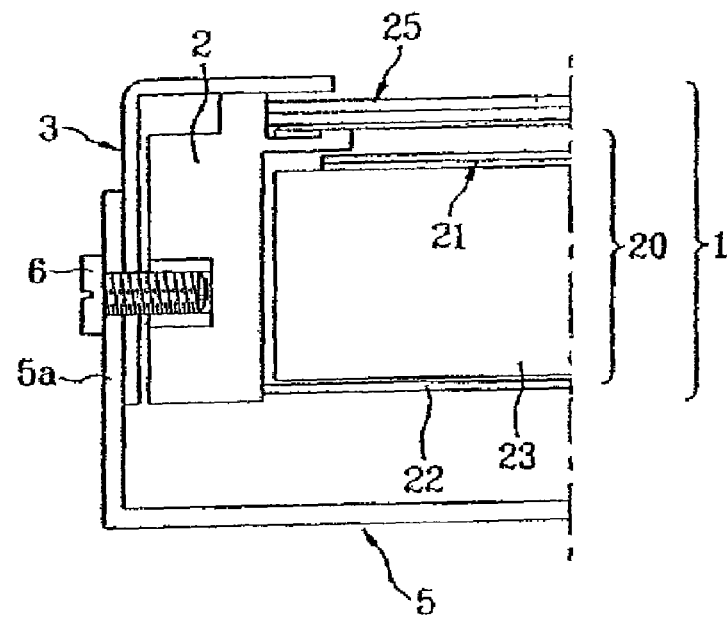
FIG. 2 is a cross-sectional view illustrating another example of one end section of a LCD device according to the related art.
Figure 3:
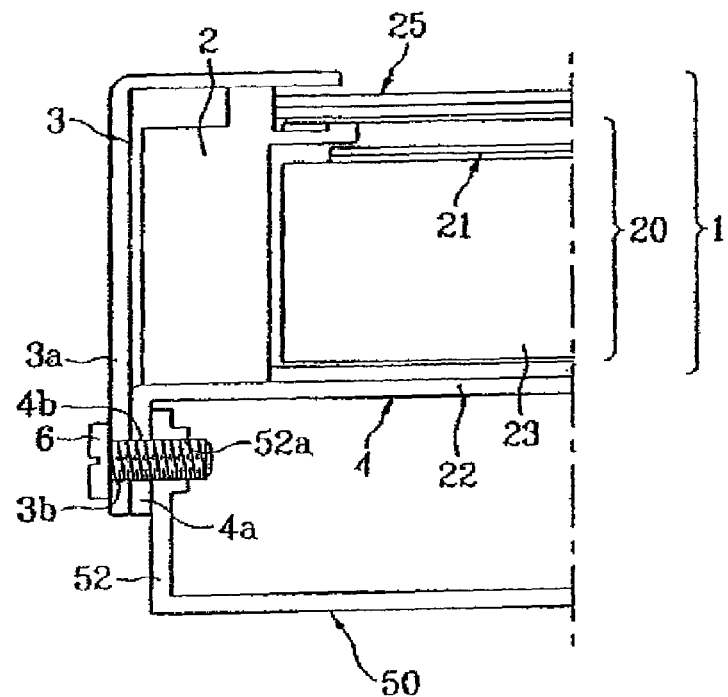
FIG. 3 is a cross-sectional view illustrating one end section of a LCD device according to the first embodiment of the present invention employing a screw fastener.

FIG. 3 is a cross-sectional view illustrating a LCD device according to the first embodiment of the present invention. As shown in FIG. 3, an LCM 1 includes an LCD panel 25 which may be used to display a picture image or other information, and a backlight 20 provided at the rear of the LCD panel 25. At this time, the backlight 20 and the LCD panel 25 are accommodated at the inside of a main support 2, the main support 2 having an empty space therein for this purpose. Also, a sash 3, preferably made of metal, having a L-shaped cross-section is provided such that one surface is positioned opposing a front side of the main support 2, and an orthogonal surface of the sash is positioned opposing a side of the main support opposite from that opposed by the LCD, thereby retaining the LCD panel 25 and the main support 2 from a front side. A bottom cover 4 is provided at a rear side of the main support 2, for supporting the backlight 20, which includes a reflecting plate 22, an optical sheet 21 and a light-guiding plate 23.

A mounting frame 50 is positioned below the LCM 1, and the mounting frame 50 is combined with the inside of the bottom cover 4. The mounting frame 50 may have an empty space to accommodate a PCB or other components, and having a side portion 52 dimensioned such that it may be combined with the inside of the bottom cover 4.

More specifically, the combination structure between the LCM 1 and the mounting frame 50 will be described as follows.

A side portion of the sash 3 is extended in the direction orthogonal to the LCD panel 25, thereby forming an extension portion 3a. End portions of the bottom cover 4 are bent rearwardly, thereby forming bend portions 4a (one of which is shown). The extension portion 3a and the bend portion 4a are positioned in contact to each other such that the bend portion 4a of the bottom cover 4 is positioned inside of the extension portion 3a of the sash 3.

Both end portions of the mounting frame 50 are bent forwardly, thereby forming the side portions 52 (one of which is shown), and the mounting frame 50 is positioned in the inside of the bend portion 4a of the bottom cover 4 such that the side portion 52 is in contact with the inner surface of the bend portion 4a. A hole is formed in the extension portion 3a of the sash 3, a second hole 4a in the bend portion 4a of the bottom cover 4, and a third hole 52a in the side portion 52 of the mounting frame 50. A screw thread is formed on the inner surface the hole 52a formed in the side portion 52, for receiving a screw 6. It is preferable to make the side portion 52 thick, to increase the depth of the hole 52a. Although not shown, in case of forming a hook in the side portion 52, insertion holes may be formed in the side portion 52 of the mounting frame 50, the main support 2 and the sash 3.

Figure 4:
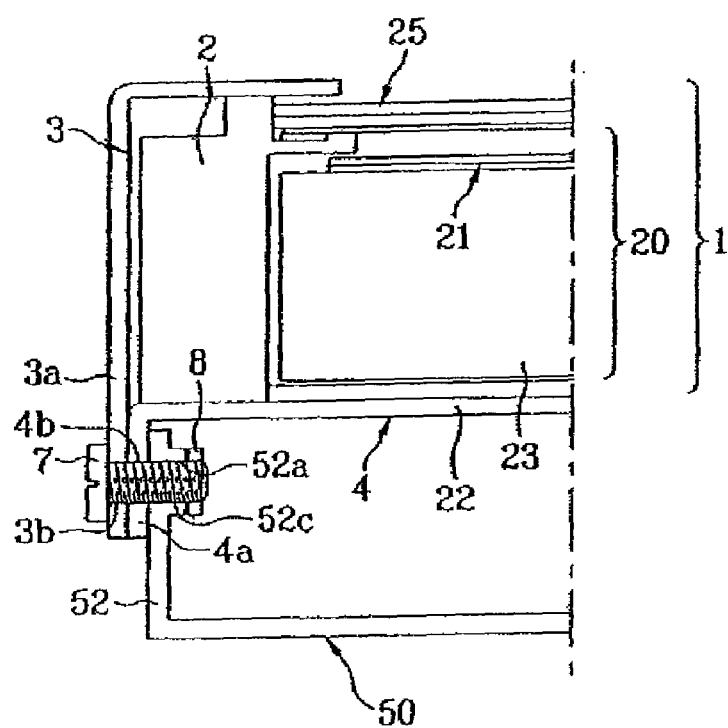
FIG. 4. is a cross-sectional view illustrating one end section of a LCD device according to the first embodiment of the present invention employing a nut and bolt fastener.
Figure 5:
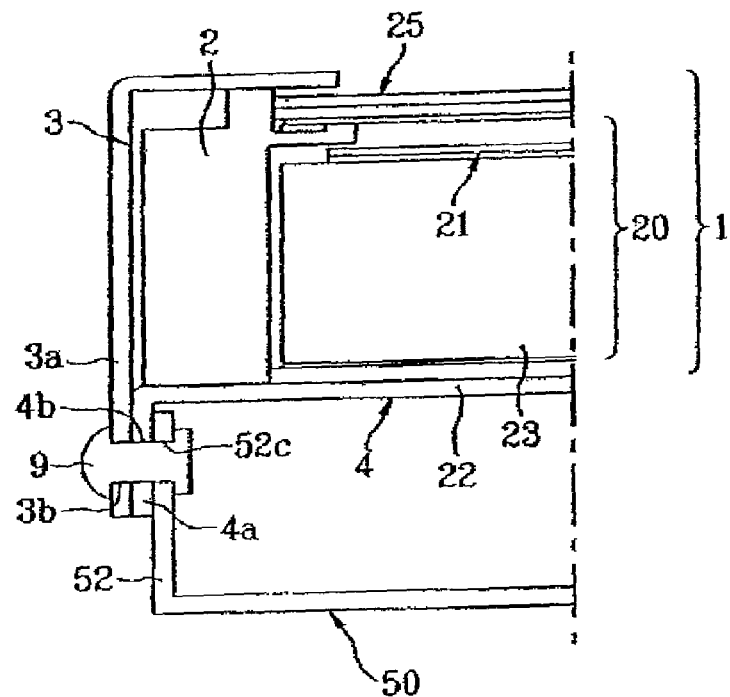
FIG. 5. is a cross-sectional view illustrating one end section of a LCD device according to the first embodiment of the present invention employing a rivet fastener.

Alternatively, as shown in FIG. 4, a bolt 7 may be inserted in holes 3b, 4b and 52c and a nut 8 used to secure the combination of the sash 3, the bottom cover 4 and the mounting frame 50. Further, as shown in FIG. 5, a rivet 9 may be inserted in the same structure, with appropriately sized holes, to secure the combination of the sash 3, the bottom cover 4 and the mounting frame 50.

As explained above, the side portion 52 of the mounting frame 50 is combined with the inner surface of the bend portion 4a of the bottom cover 4. That is, the mounting frame 50 is combined not with the outer surface of the sash 3, but with the inner surface of the bottom cover 4. Accordingly, in comparison with the width of the related art LCD device, the present invention decreases the width of the LCD device corresponding to the thickness of the side portion 52 of the mounting frame 50, the reduction in width occurring also at the opposite end of the LCD device (not shown).

Figure 6:
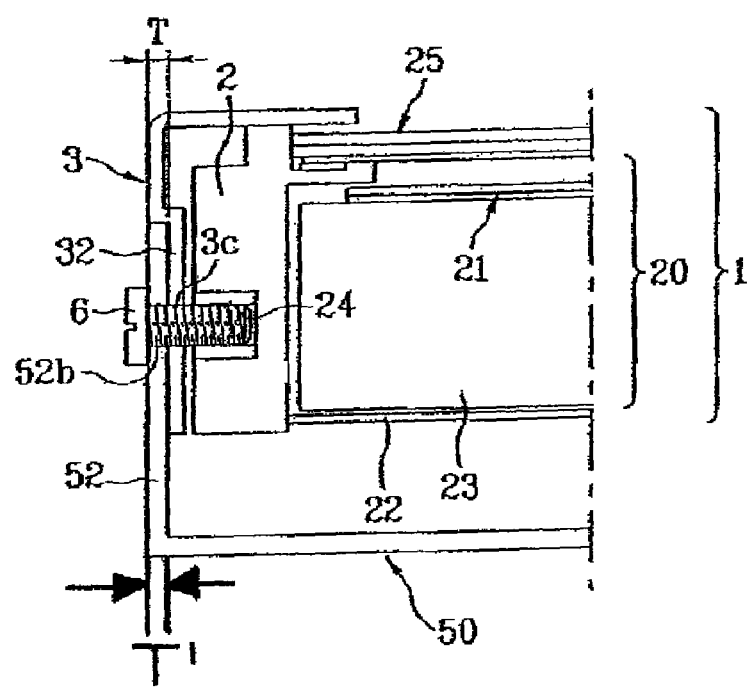
FIG. 6 is a cross-sectional view illustrating one end section of a LCD device according to the second embodiment of the present invention.

FIG. 6 is a cross-sectional view illustrating LCD device according to the second embodiment of the present invention. Referring to FIG. 6, an LCM 1 includes an LCD panel 25 displaying a picture image or other information, and a backlight 20 provided to the rear of the LCD panel 25. The backlight 20 and the LCD panel 25 are accommodated inside a main support 2. For this, the main support 2 has an empty space for accommodating the backlight 20 and the LCD panel 25 therein. A sash 3, preferably made of metal, is provided at an upper portion of the main support 2 for retaining the LCD panel 25 and the main support 2 from a front side. Also, a bottom cover (not shown for clarity of illustration) is provided at a lower portion of the main support 2, for supporting the backlight 20 which includes a reflecting plate 22, an optical sheet 21 and a light-guiding plate 23.

Meanwhile, a predetermined portion of the sash 3 is bent inwardly and then bent downwardly such that it is parallel to an adjacent plane of the sash, thereby forming a step-difference portion 32 in the sash 3, offset from the adjacent plane thereof by a thickness T. As the sash 3 has the step-difference portion 32, the main support 2 has a reduced thickness for at least the portion facing the step-difference portion 32. Both end portions of the mounting frame 50 are bent upwardly, thereby forming the side portions 52 and the mounting frame 50 is combined with the step-difference portion 32 of the sash 3. The mounting frame 50 side portion 52 may be dimensioned for accommodating the thickness of a PCB or other components between the mounting frame and the bottom cover, and the side portion 52 is combined with the step-difference portion 32 of the sash 3.

More specifically, the structure will be described as follows: The side portion 52 of the mounting frame 50 is positioned in the step-difference portion 32 of the sash 3, such that the side portion 52 forms the outer member. The side portion 52 preferably does not project outside of the sash 3 in the width direction. Thus, it is preferable to form an offset thickness T of the step-difference portion 32 with respect to the side of the sash 3 as at least equal to the thickness T′ of the side portion 52. A hole 52b is provided in the side portion 52 and a hole 3c is provided in the sash 3. Also, a hole 24 is provided in the main support 2 corresponding to the holes formed in the side portion 52 and the step-difference portion 32. A screw thread is formed on inner surface of the hole in the main support 2, to accommodate a screw 6, the screw being inserted from the outside surface of the side portion 52 of the mounting frame 50.

As explained in the first embodiment of the present invention, in case of forming a hook in the side portion 52, insertion holes may be provided in the side portion 52 of the sash 3, and the support main 2.

In the preferred embodiment of illustrated in FIG. 6, the side portion of the mounting frame 52 is combined with the step-difference portion 32 of the sash 3 instead of the outer surface of the sash 3, so that it is possible to decrease the width of the LCD device by the thickness corresponding to the side portion 52.

In the structure of the LCD device according to the present embodiment, the mounting frame is mounted inside the maximum width of the LCM, thereby reducing the width of the LCD device. For example, if the mounting frame 50 has a thickness of 1 mm, width of the LCD device is decreased about 2 mm with respect to the related art.

It will be apparent to those skilled in the art that various modifications and variations can be made in the present invention. Thus, it is intended that the present invention covers the modifications and variations of this invention as may come within the scope of the appended claims and their equivalents.

What is claimed is:

1. A structure comprising:
    a main support that accommodates a LCD panel and a backlight provided to a rear of the LCD panel;
    a sash provided above the main support that retains the LCD panel and the main support from a front side, the sash having a step-difference portion offset parallel to a plane; and
    a mounting frame having side portions that oppose each other and positioned in the step-difference portion such that a width of the side portions is greater than a width of an offset of the step-difference portion with respect to a side of the sash, the mounting frame being fastened to the main support.

2. The structure of claim 1, wherein a volume bounded by the mounting frame and a bottom cover is dimensioned for accommodating an additional component.

3. The structure of claim 2, wherein the additional component comprises a circuit board.

4. The structure of claim 1, wherein holes are provided in the mounting frame, the step-difference portion of the sash and the main support.

5. The structure of claim 4, wherein a screw thread is provided in an inner surface of the hole in the main support.

6. The structure of claim 5, wherein the fastener comprises a screw.

7. The structure of claim 1, wherein a fastener is provided in one of a side portion of the main support and the side portion of the mounting frame and, engaging portions are provided in the sash and at least one of the mounting frame and the main support.

8. The structure of claim 7 where the fastener comprises a hook.

9. The structure of claim 7, wherein the engaging portions comprise holes.

10. A LCD device comprising:
    a main support accommodating a LCD panel and a backlight provided to a rear of the LCD panel and a mounting frame having side portions that oppose each other and positioned in a step-difference portion;
    a front side retaining means for retaining a front side of the LCD panel and a front side of main support, the front side retaining means having a step-difference portion offset parallel to a plane of the front side retaining means, wherein the front side retaining means is provided above the main support; and means for combining the front side LCD retaining means, the main support and the mounting frame,
    wherein the side portions of the mounting frame are positioned in the step-difference portion such that a width of the side portions is greater than a width of the offset of the step-difference portion with respect to a side of the front side retaining means.

11. A method of reducing a width of a structure for mounting a LCD display comprising:
    supporting a LCD panel and a backlight with a main support;
    retaining the LCD panel from a front side using a sash that is provided above the main support that retains the LCD panel and the main support from a front side;
    forming a step-difference portion of the sash parallel to a plane of the sash;

providing a mounting frame comprising side portions forming to the step difference portion:

positioning the side portion of the mounting frame outside the step-difference portion of the sash such that the side portion of the mounting frame formed as an outer member, wherein the side portions oppose each other and face a surface of the step-difference portion; and combining the sash and a the mounting frame with fasteners selected from the group consisting of screw, a thread, a nut and bolt, a rivet, and adhesive, wherein the forming the step-difference portion comprises offsetting the step-difference portion with respect to the side of the sash such that a width of the side portions is greater than a width of the offset of the step-difference portion with respect to a side of the sash.

\* \* \* \* \*